April 24, 1928.
E. F. TIPTON
1,667,402
CAR TRACK GROOVE CLEANER
Original Filed Oct. 14, 1926   2 Sheets-Sheet 1
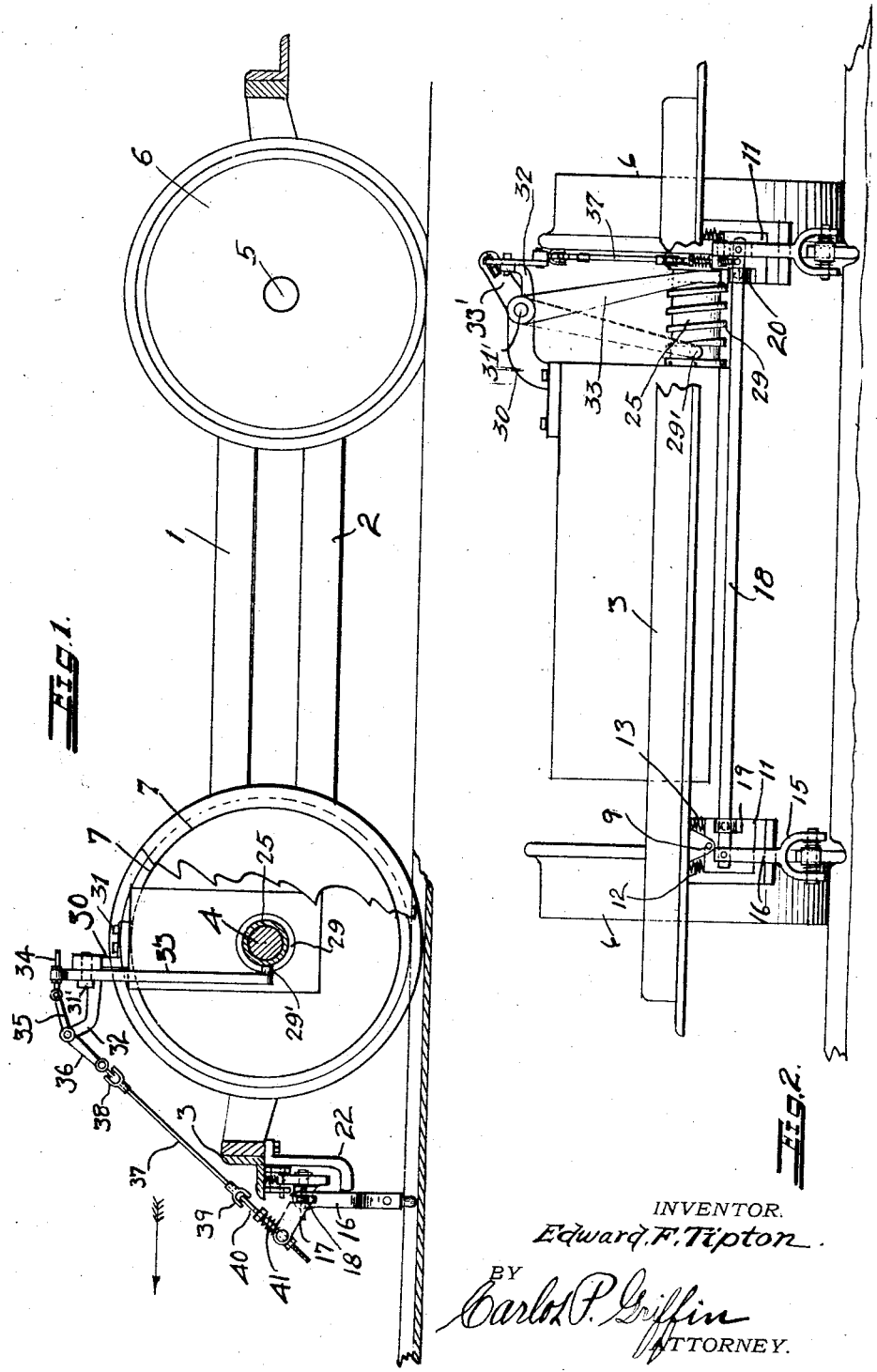
INVENTOR.
Edward F. Tipton
BY
Carlos P. Griffin
ATTORNEY.

April 24, 1928.
E. F. TIPTON
1,667,402
CAR TRACK GROOVE CLEANER
Original Filed Oct. 14. 1926
2 Sheets-Sheet 2
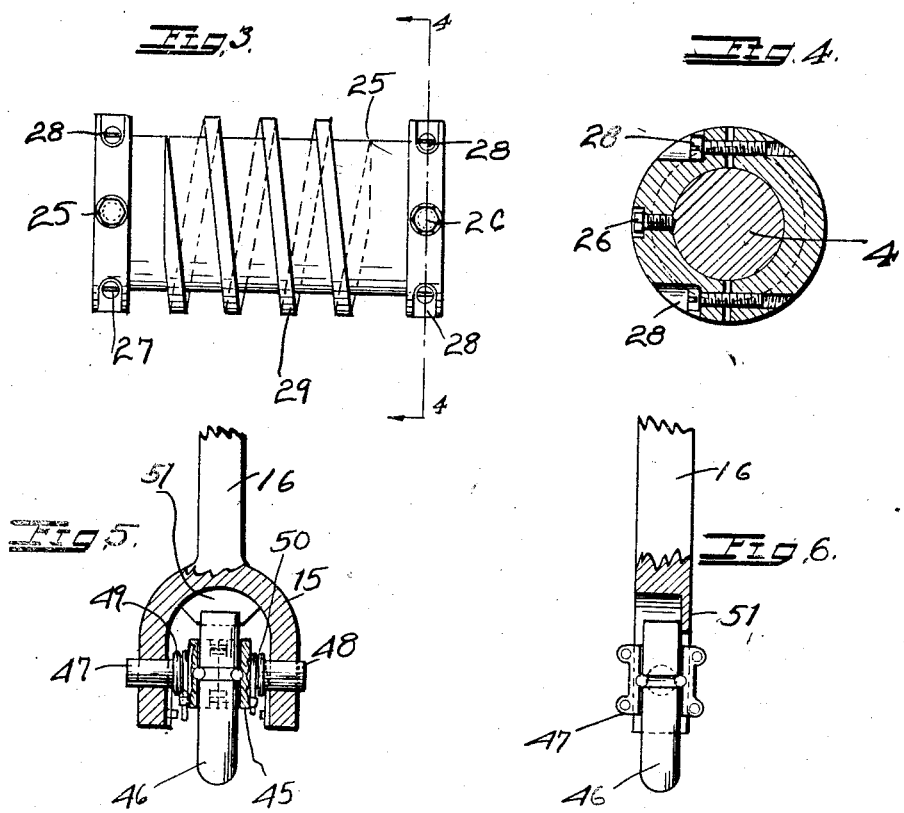

Patented Apr. 24, 1928.

1,667,402

UNITED STATES PATENT OFFICE.

EDWARD F. TIPTON, OF SAN FRANCISCO, CALIFORNIA, ASSIGNOR OF ONE-FOURTH TO VINCENT P. KING AND ONE-FOURTH TO WILLIAM W. BOSTWICK, BOTH OF SAN FRANCISCO, CALIFORNIA.

CAR-TRACK-GROOVE CLEANER.

Application filed October 14, 1926, Serial No. 141,446. Renewed December 19, 1927.

This invention relates to a track groove cleaner for street cars and its object is to provide means whereby the grooves of the ordinary street car track may be cleaned before the car strikes such hard objects as bolts or other things that may be swept into the groove of the track, thereby injuring the wheel and breaking the flanges.

It is understood by those skilled in the art at the present time it is very common to use as standard track a groove rail in all street car service in cities for the reason that such tracks are much easier upon the wheels of the ordinary automobile and wagon traffic than any other type of track, but unfortunately these grooves form a lodging place for bolts, and nuts and other objects of that character, which cause the breakage of numbers of wheels in passing over them, either cracking the wheel, or breaking a piece off of the flange of the wheel. Inasmuch as such wheels are very hard, almost chilled, it is impossible to do anything with them by way of repairs, and the only thing to do is take them off and insert a new pair of wheels. With the present invention a device is operated ahead of the wheel to clear the groove of any foreign object which device is removed from contact with the track as soon as the car reverses its direction.

In the present instance one of these track cleaners is used in front of the front and back wheels on each rail, four of the cleaners are thus supplied to each car, but only two of them are in use at any one time.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of a portion of a car truck showing this cleaning device applied thereto, and of course the same character of device is applied to the truck at the opposite end of the car so that only one illustration is given, Figure 2 is a front elevation of a car truck with this cleaning device applied thereto, Figure 3 is a side elevation of the screw which is used for shifting the cleaning device from contact with the track to its inoperative position, Figure 4 is a transverse sectional view of line 4—4 Figure 3, Figure 5 is a view partly in section of the device for holding the cleaning device in position, and Figure 6 is a view of the groove cleaning device showing the safety feature, in connection therewith.

In the drawings the numerals 1 and 2 represent the upper and lower portions of the truck frame extending longitudinally of the track, these truck frames being connected by transverse frame 3 in which the car axles 4 and 5 are journalled, each axle carrying a wheel 6 and 7.

The track cleaning device is secured to the projecting ends of the car truck frame by means of a bracket 9 having two ears secured and depending from the angle member 3. A plate 11 is pivotally mounted in the depending bracket 9, two springs 12 and 13 substantially equal in compressingly holding said plate 11 normally in the position shown in Figure 2. The cleaner yoke 15 is supported from a vertically extending arm 16 which also has an inturned arm 17 connected therewith.

There are two of the cleaner yokes, one for each rail, and they are turned on the transverse rod 18 said rod being journalled in boxes 19 and 20 on the depending plate 11 at each side of the truck. The depending standards 22, one for each arm or yoke, prevent the yokes from passing the vertical when the car is moving in the direction of the arrow, Figure 1.

A cylindrical shell 25 consisting of two parts secured together by bolts at 25 and 26 and screws 27, 28, with a screw thread 29 thereon, furnishes the means for shifting the scrapers from the operative to an inoperative position.

On the top of the truck frame there is a bracket 30, which bracket has a bolt 31 extending therethrough, and the bracket is also provided with an arm 32. The bolt 31' pivotally supports a lever 33 which lever is movable transversely of the car truck to effect the shifting of the car track cleaner in a manner to be presently explained. The lever 33 has connected to it an integral short arm 33' which in turn is so positioned as to operate on a rod 34 which is connected to the bell crank lever 35 integral with the bell crank lever 36 supported by, and pivotally connected to the arm 32. A rod 37 secured by a universal joint 38 to the lever 36 and by a universal joint 39 to the rod 40 connected to the arm 17 by the spiral spring 41 affords means to operate the track cleaner. The track cleaner itself consists of a slide 45, which has a plurality of balls bearing a hardened pin 46 to permit it to rotate at will as it touches the track. This slide is supported by two trunnions 47, 48 carried by the lower end of the yoke 15, and two spiral springs 49, 50 tend to hold the scraper 46 in a central position, although a certain amount of flexibility is necessary in going around curves and because of any irregularities in the track. A stop 51 on the yoke holds the scraper 46 in the proper position, but at the same time if it strikes too heavy an obstacle it will break and permit it to swing by without breaking the yoke.

A pin 29' on the end of lever 33 is adapted to engage the threads 29 when the direction of the car is reversed from that shown by the arrow in Figure 1.

The friction of the pin in the track tends to move the arm 16 enough so that the lever 33 is moved to throw the pin 29' into line of the first thread of threads 29 whereupon the lever 33 is carried to the position shown in the dotted lines, and is held there by the action of the threads until the car is reversed again, the weight of the arm 16 bringing the pin 29' into mesh with the thread which returns the arm to the starting point.

The operation of the apparatus is as follows: Assuming the car to be going in the direction shown by the arrow, Figure 1, the lever 33 will be thrown in a certain direction and the bar 16 will be turned down with the pin 46 in contact with the groove of the track. This will also turn the rod 18 down and bring the pin 46 on the left hand wheel, Figure 2, in contact with the track. When the direction of the car is reversed, the spiral rib on the car axle will carry the lever in the opposite direction and that will cause the pin in contact with the track groove to be lifted out of contact therewith so that there will be no wear upon the pin during the time the car is running in the direction with the pin at the rear of the car truck.

Having thus described my invention, what I desire to secure by Letters Patent of the United States is as follows, but modifications may be made in carrying out the invention as shown in the drawings and in the above particularly described form thereof within the purview of the annexed claims.

1. In a track groove cleaner for cars, a swinging yoke pivotally mounted on a car truck, a thread on the car axle, a lever operated by said thread whereby the yoke will be raised when the car is traveling in one direction, and lowered when the car is traveling in the other direction, and a pin carried by the yoke to project into the track groove to expel foreign bodies therefrom.

2. In a track groove cleaner for cars, a yoke pivotally mounted upon a car truck, a second yoke at the opposite side of the car truck from the first truck, means connecting them to operate them together to be raised or lowered, a screw thread on the car axle, a lever in contact with said screw thread whereby the yokes are raised when the car is traveling in one direction and lowered when the car is traveling in the opposite direction, and a pin carried by each yoke which is adapted to project into the grooves of each rail when the car is traveling in the proper direction and the yoke lowered.

In testimony whereof I have hereunto set my hand this 5th day of October, A. D. 1926.

EDWARD F. TIPTON.